UNITED STATES PATENT OFFICE.

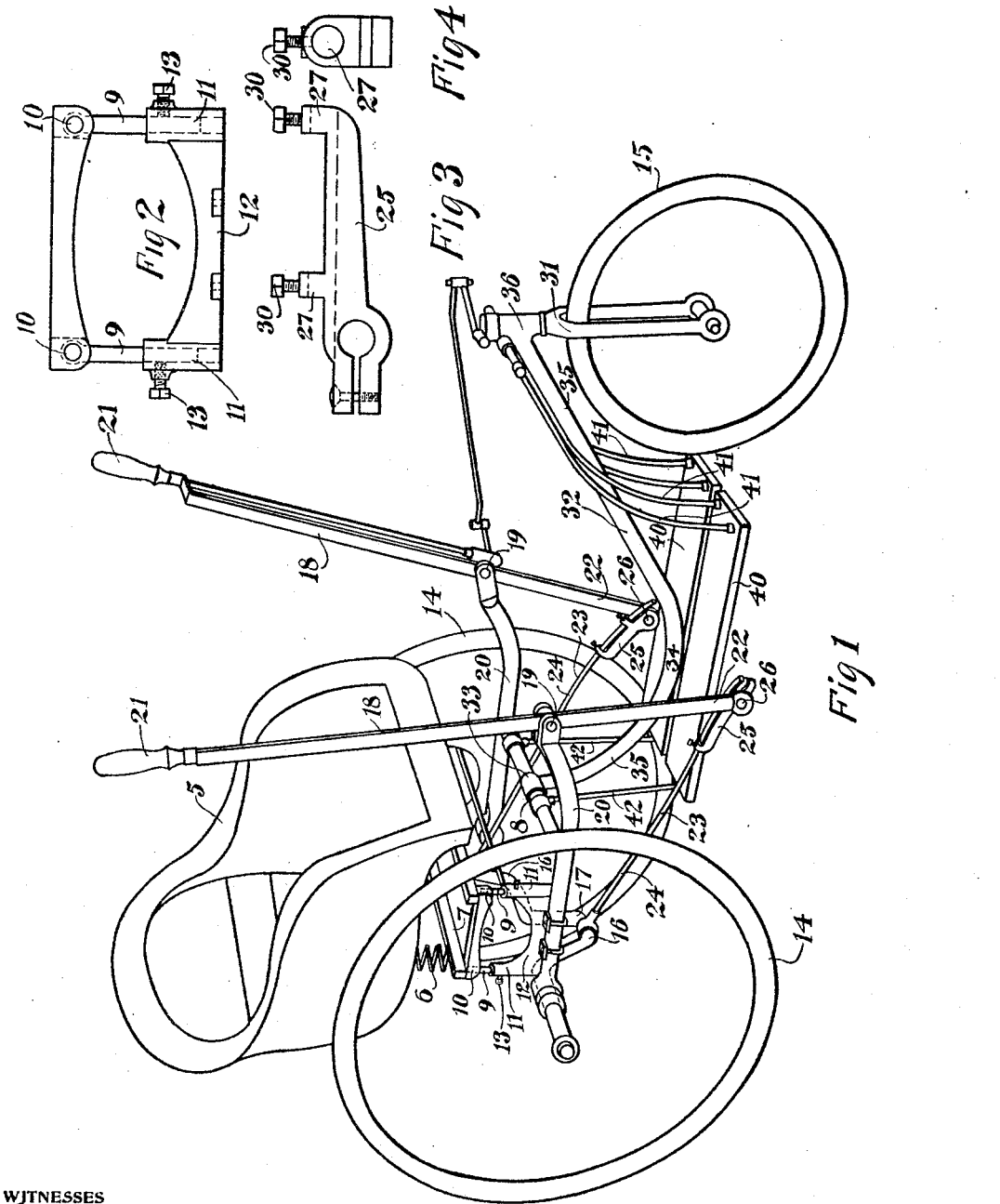

JAMES C. SMITH, OF ELYRIA, OHIO, ASSIGNOR TO THE MACHINE PARTS COMPANY, OF ELYRIA, OHIO, A CORPORATION OF OHIO.

VEHICLE.

1,105,216. Specification of Letters Patent. Patented July 28, 1914.

Application filed August 7, 1912. Serial No. 713,730.

*To all whom it may concern:*

Be it known that I, JAMES C. SMITH, a citizen of the United States, residing at Elyria, in the county of Lorain and State of Ohio, have invented certain new and useful Improvements in Vehicles; and I do hereby declare the following to be a full, clear, and exact description of the invention, such as will enable others skilled in the art to which it appertains to make and use the same.

My invention relates to improvements in vehicles, and more particularly to the class of vehicles which are commonly known as invalid chairs, by reason of their adaptability for the transportation of cripples or invalids who are incapable in one way or another, but at the same time enabled to propel a specially constructed vehicle of the nature described. In the form of my invention illustrated, I show such a vehicle which is adapted to be operated by the arms of an individual—for example, one whose lower limbs are defective or useless.

Hitherto, so far as I am aware, vehicles of this kind have been constructed with the seat supported from the rear wheels and the front or front wheels used for steering. The front and rear wheels have been connected by means of some kind, usually a single member, commonly known as the back bone member, which also supports the foot rests or board. In order to make the back bone member strong enough to sustain the weight of the person, it is necessary to arch it upward. Such a construction places this member in the way of the cripple, and is apt to trip him in getting in and out of the car, frequently with serious consequences to him.

One of the objects of my invention is to avoid this form of structure and to produce a structure which instead of obstructing his climbing in and out the vehicle, will permit him to mount the seat and dismount therefrom without danger.

In vehicles of this character produced heretofore, the propelling levers have been rigidly connected to the crank rods, mainly because these parts transmit the power for propelling the vehicle, and must consequently be rigid and firmly connected together.

Another object of my invention is the provision of suitable means for connecting the propelling levers to the crank shaft, which will permit the extension or contraction of this connection in order to enable me to arrange the path of travel of the handles of the propelling levers in a position suitable for the particular person propelling the car or the particular condition of that person, as it sometimes happens that a malady will produce a change in the condition of the cripple, making it necessary for him to change the normal position of the propelling levers or else to purchase a new chair outright. I also aim to produce mechanism of this kind which can readily be manipulated by the cripple, who, as a rule, is unskilled in matters of this kind.

Another object of my invention is the provision of means for suitably arranging the seat upon a vehicle of this kind.

The nature of the malady or defect of cripples who purchase these chairs is varied, some being crippled in one part of the body and some in another. Considering two examples, one in which the arms of the cripple are intact, and one in which his lower limbs are intact, it will readily be appreciated that where the arms are used for propelling, the seat should be tilted backward, and the amount of tilt should depend upon the particular nature of the individual crippled. This gives the cripple a better grip upon the seat, so that he can the more securely maintain his position therein while operating the propelling levers. Such an arrangement of the seat would almost entirely prevent the operation of the propelling means by the feet and legs, since the elevated front attached on the seat would restrict the movements of the thighs. Other and numerous cases might be considered, but these two would illustrate the necessity for arranging the seat to meet the particular cripple or the particular condition of the cripple who owns the particular chair.

Other objects of my invention and the invention itself will be best understood from the particular description of the embodiment shown in the accompanying drawings.

Figure 1 is a perspective view of a vehicle illustrating my invention. Figs. 2, 3 and 4 are details of the connecting means.

Referring now to the drawings and to the particular embodiment of my invention illustrated therein, at 5 I show the seat of an invalid chair which is mounted upon springs 6 connected to a seat frame 7 which is mounted in the frame 8 of the vehicle. I provide suitable means for raising and lowering the seat, so as to arrange it in a desired position, and prefer to use independent means at each corner of the seat. In the form shown, pistons 9 are pivoted as shown at 10 to the seat frame and extend into piston cylinders 11 which may be connected by a member 12 and fastened by suitable fastening means to the frame 8. Set screws 13 or other suitable fastening means are used for tightly clamping the pistons in their cylinders. At 14 I show the rear wheels, and at 15 the front wheel, since in the form illustrated, but one front wheel is employed. The wheels 14 are upon crank shafts 16, the crank being shown at 17. The propelling levers 18 are pivoted at 19 to arms 20 in the frame, though they of course may be connected in any suitable manner to any suitable part of the frame. Handles 21 are mounted upon the upper end of these levers, and the lower ends of the lever 22 are connected to the crank 17. In the form shown, I employ extensible means 23 which are best made of rods 24 and connecting means 25 for connecting them to the ends 22 of the propelling levers. In the form shown, these are pivoted as shown at 26 to the lower end of the lever. These connecting levers are provided with eyelets 27 through which the rods 24 extend, and with clamping devices, such as a set screw 30 for firmly clamping the rods in position in the connecting means. Should the cripple desire to change the path of travel of the handle 21 or either of the propelling levers, he loosens the set screws 30, draws the rod farther out of the eyelets of the connecting means, or drives it farther in until the desired arrangement is made, when the set screws are forced down and the connecting rod firmly clamped to the propelling lever. The front wheel 15 is mounted in the fork 31 which is connected by a back bone member 32 to a cross piece 33 in the frame. The member 32 is depressed in the center as shown at 34, rising in a sharp curve shown at 35 to its connection with the frame piece 33, and inclining gradually at the other end, as shown at 35 to its connection with the frame head 36. By this arrangement I furnish a strong connection between the front and rear wheels, and at the same time, place the back bone member out of the way of the cripple when he climbs in and out of the seat. I am enabled to do this by taking the support of the foot boards 40 from the back bone member and connecting it as shown directly to the frame head 36 at one end and to the frame at the other. I employ suitable means, such as rods 41 for connecting the foot board to the frame head, and rods 42 for connecting it to the frame.

It will be readily understood that numerous and extensive departures from the form and the details of the apparatus here shown may be made without departing from the spirit of the invention, this embodiment being illustrated solely for the purpose of clearly illustrating one specific embodiment of the invention.

I claim:—

1. In a device of the class described, the combination of a pair of rear wheels and a front wheel, a frame, a transverse member in said frame adjacent said rear wheels, a frame head on said front wheel, a lever and means connecting the lever with the front wheel whereby the vehicle is steered through the front wheel, the lever and said means, a longitudinal backbone member connecting the said frame head with the said transverse member, said backbone member extending downwardly from its junction with said transverse member to a point of maximum depression and inclined thence upwardly to the frame head, a foot rest on either side of said backbone member and suspended between the wheels independently of said back bone member, said foot rest being in substantially the same horizontal plane as the point of maximum depression of the backbone member, substantially vertical rods connecting the rear of the rest to said transverse member, and curved rods connecting the front of the rods to the frame head.

2. In a device of the class described, the combination of a pair of rear wheels and a front-wheel, a frame, a passenger seat supported from said frame, a transverse member in said frame adjacent said rear wheels, a frame head on said front wheel, a lever connected to the frame piece and controllable from the seat, means connecting the lever to the front wheel for steering purposes, an arcuate, longitudinal backbone member between said transverse member and said frame head, said back-bone member curved downwardly from its junction with the transverse member to a point of maximum depression in front of said seat and inclined thence to its point of junction with the frame head, a pair of foot rests, one on either side of said backbone member and suspended between the wheels independently of said backbone member, said foot rests being in substantially the same horizontal plane as the point of maximum depression of the backbone member, means to connect one end of the foot rests to the transverse member, and means to connect the front end of the foot rests to the frame head.

In testimony whereof I affix my signature in the presence of two witnesses.

JAMES C. SMITH.

Witnesses:
M. E. WILLIAMS,
M. E. COGHLAN.

---

Copies of this patent may be obtained for five cents each, by addressing the "Commissioner of Patents, Washington, D. C."